Patented Apr. 7, 1953

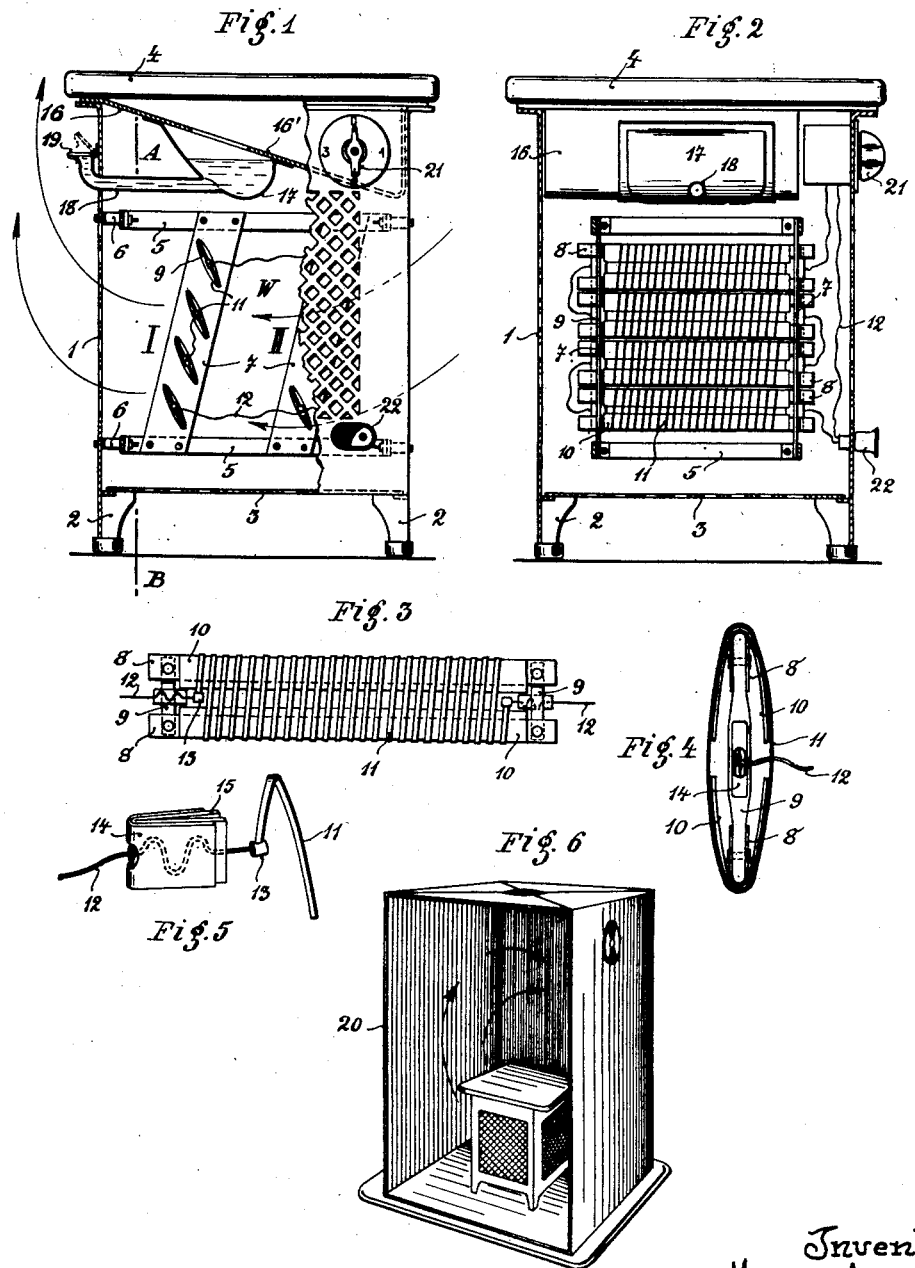

2,634,362

UNITED STATES PATENT OFFICE 2,634,362

ELECTRIC HOT-AIR STOVE PARTICULARLY FOR MEDICAL AND SANITARY PURPOSES

Martin Achner, Munich, Germany

Application January 13, 1950, Serial No. 143,332
In Germany September 20, 1949

2 Claims. (Cl. 219—38)

The present invention relates to electric heating stoves and is especially directed to a novel type of electric hot-air stove which is particularly suited for medical and sanitary purposes.

Most of the known electric hot-air stoves employ heating elements composed of lines of glow-lamps or wires wound around insulating cores and are so devised that two or three different heating stages (weak, medium and powerful) can be switched in. It is further known to construct the stoves in such a way that every heating stage consists of a plurality of individual heating elements united together to form the heating stage.

However, all of these known types of hot-air stoves have the disadvantage that the flow of heated air caused by them does always take place in an entirely uncontrolled way. Regardless of whether one or all of the heating stages are switched in, the heated air produced by the stoves does always flow in irregular fashion in all directions and then, upon leaving the stove, does chiefly rise to the top of the room. If the stove is provided with a back-wall of curved formation, the heated air may leave the stove at the front side. But any further regulation of the flow of the heated air by the heating elements is absolutely impossible.

The present invention has for its object to devise an electric hot-air stove provided with two or more heating stages, and in which through the heating elements, independent of the manner in which they are connected, differences in temperature and, as a result thereof, a controlled circulation of the heated air in predetermined direction is forcibly created. A circulation of this type has several advantages. The principal advantage is the quick heating of the room, regardless of its size, whereby, of course, the heating capacity of the electric heating elements should be adapted to the size of the room. Another likewise very important advantage is the uniform heating of the room, preventing differences in heat accumulation with its unpleasant and harmful effects for the health. If, for example, an electric hot-air stove is used for heating a sweating box or cabin, the gentle and uniform heating of the unclothed body is of greatest importance, as local application of the heat would, naturally, limit the sweating process and have an irritating effect on the skin. But the controlled circulation of the heating air is of greater importance still, if for healing or curative purposes special ingredients have been added to the air which, after evaporation in the stove, should be applied to the body in uniformly distributed manner.

According to the invention the controlled circulation of the heating air is obtained through the provision of a plurality of different heating stages, having each of them a heating power which is different from the heating power of the other heating stages.

In known electric hot-air stoves the heating power of the different heating stages is the same for all of the heating stages, each of them having a heating power of, for instance 500 or 700 or 1000 watt, so that in case of three heating stages the heating power of the middle stage would amount to 1000 or 1400 or 2000 watt, while the total heating power would amount to 1500 or 2100 or 3000 watt. Hence, whatever heating stage may be switched in, every heating stage, unless disconnected, will produce the same amount of heat.

In the heating stove disclosed in the present application this is not the case. According to the invention every heating stage possesses a different heating power, as for instance 500 watt for the first stage, 700 watt for the second stage and 1000 watt for the third stage, while the different heating stages are separated from one another by air gaps. Whenever at least two of these heating stages are switched in, differences in temperature and differently heated air currents will be produced, which will cause the air to circulate in a certain and definitely determined direction.

Additional features and advantages of the invention will be understood from the following detailed description, taken in connection with the accompanying drawings, showing by way of example a preferred embodiment of the invention. However, it is to be understood that the invention is not confined to any strict conformity with the drawings, but may be changed or modified, so long as such changes or modifications mark no material departure from the salient features of the invention as expressed in the appended claims.

In the drawings, in which similar numerals of reference indicate corresponding parts in all of the several figures Fig. 1 is a side elevation, partly in section, and with portions of the casing broken away to show the interior of the stove;

Fig. 2 is a front elevation of the stove with the casing removed to show the electric heating elements of one of the heating stages;

Fig. 3 is a side view of a heating element;

Fig. 4 is a front view on an enlarged scale of the heating element of Fig. 3;

Fig. 5 is a perspective view of a clamping member for the electric cable;

Fig. 6 is a perspective view of an electric hot-air stove placed in a sweating box.

Referring now to the drawings in detail, the reference numeral 1 denotes the sheet-metal casing of the electric hot-air stove provided with perforated side-walls (see right side of Fig. 1) to facilitate the circulation of the air. The casing 1 is supported in position on the floor of the room by means of the legs 2, and covered up at the bottom by the perforated bottom-plate 3, and at the top by the heat insulating cork plate 4, so that the stove can also be used as a stool.

In the embodiment illustrated in Fig. 1 two heating stages I and II have been arranged in the casing 1, whereby care has been taken that the current carrying parts are reliably protected against touch. That is why frames 5, which are made up from sheet-metal strips, are fastened to the side-walls of the casing 1 by means of the insulating and distance regulating members 6, and why between the upper and lower frames 5 oppositely disposed metal strips 7 have been arranged. The metal strips 7 serve as a stiffening means for the frames 5 and simultaneously act as supports for the electric heating elements. The heating elements are transversely positioned between the metal strips 7, which for that purpose have been provided with suitable bearing openings. In the form of invention illustrated in Fig. 1 each heating stage consists of four heating elements, which are diagonally arranged above one another in the metal strips 7.

Every heating element consists of two U-shaped frame members 8 (see Figs. 3 and 4) secured together at their ends by means of the cross-members 9, so that a rectangular frame is formed. The frame members 8 are surrounded by the strips 10 of V-shaped conformation and consisting of resilient insulating material, such as mica or the like. Wound onto the strips 10 are wide band-shaped heating coils 11. The two ends of every heating band 11 are connected in current conducting manner to the cables 12. In order to protect these connections in a simple and yet reliable way against unintended loosening, the ends of the bands 11 are first secured to the ends of the cables through clamping or soldering with the aid of the connecting members 13, whereupon the cables are passed in a sinuous line through the clamping members 14 provided with an inner insulating lining 15 in such a way that the several curves of that sinuous line are all positioned in the same plane. (See Figs. 3 and 5.) The clamping member 14 is then inserted between the cross-members 9 and clampingly secured therebetween. (See Fig. 4.) In this way a safe and lasting connection is produced which is not only free from the customary screw plugs, but also reliably protected against pull, which is of greatest importance for the maintenance of a permanent contact subjected to considerable changes in temperature.

Heating elements equipped with the aforesaid heating band 11 provide not only a heating surface of remarkable width, but also have the further advantage that they will not begin to glow before the necessary maximum temperature of approximately 400 degrees centigrade has been reached, contrary to the filament lamps or ordinary glow spirals which, because of constant glowing, only have a comparatively short lifetime. Owing to the fact that no fully glowing wires are employed the heating elements of the present invention produce an absolutely pure and inodorous heating air and, in addition to that, a mild and thorough heating effect, because only long-waved heat is radiated, contrary to the short-waved heat radiation produced by the glow-wires of the known stoves. A tightly stretched condition of the heating bands, even in case of greatest heat expansion through high temperatures, is obtained in the simplest way through the resiliency of the insulating strips 10, which also prevent a displacement of the heating bands through shocks during the transport or when moved about on the floor.

As has already been mentioned, two heating stages I and II have been provided in the form of construction illustrated in Figs. 1 and 2, whereby stage I has been devised for a current of 1000 watt and stage II for a current of 700 watt. According to the invention the two heating stages are separated from each other by an air gap, so that a vacant space of considerable width is created between them (see Fig. 1).

The different heating capacities of the two heating stages I and II in combination with the air gap W arranged between them, not smaller than one-third of the inside diameter of the stove, produce the result that, when both heating stages of a combined heating power of 1700 watt are switched in, an unsymmetrical heat development of great differential effect will take place and cause a forced circulation of the air surrounding the stove. The direction of the air circulation has been indicated by arrows in Fig. 1. The heated air produced by the powerful heating stage I attempts to escape from the stove as quickly as possible, whereupon the air heated by the heating stage II takes its place and is heated by the heating stage I to higher temperature and thereby caused to circulate at increased speed.

For guiding the flow of air in the stove the latter is provided at its upper end with a guide member 16 of curved sheet-metal or the like (see Figs. 1 and 2), which extends from the heating stage II in ascending direction toward the outflow side, so that the cross-section of the flow-passage of the heating air gradually increases toward the outflow side.

If the stove is to be used for medical or sanitary purposes, that is to say for sweating boxes or the like, it may frequently be necessary to condition the circulating air according to requirements through the admixture of water vapor or medicinal vapors. In cases of this kind the guide member 16 may simultaneously be used as a support for an evaporator basin 17 (Fig. 1), which may be attached to the underside of the guide member 16, above the heating elements, for automatic heating by the heating elements. From the evaporator basin 17 a pipe 18 is leading to the outside, so that the basin containing the liquid to be evaporated can be refilled from the outside without difficulty. It will be noticed that the inlet opening of the pipe 18 has been so arranged that it is positioned in the same plane as the highest possible liquid level in the evaporator basin, so that the quantity of liquid in the basin can always be controlled from the outside and constantly be kept at the same level, whereby overfilling of the basin with the liquid would immediately result in an outflow of the surplus quantity of liquid at the inlet opening.

It is further necessary to prevent an unintended outflow of the liquid out of the basin 17 or the pipe 18 or a trickling down of the liquid on the heating elements when the stove is knocked against or pushed around on the floor.

For this purpose the inlet branch of the pipe 18 is equipped with a spring controlled closure member 19, while the basin 17 has been provided with a projecting edge portion 16¹ whereby splashing out of the liquid is reliably prevented, while the evaporation of the liquid is not interfered with.

If the seat-plate 4 is not rigidly secured to the stove, but removably or hingedly mounted thereon, it is also possible to refill the basin 17 from above, so that the filling pipe 18 can be dispensed with.

If an electric hot-air stove of this type is placed in the sweating box 20, as illustrated in Fig. 6, the air circulation will take place as indicated by the arrows, so that the air in the box is heated in a perfectly uniform manner. The person taking the hot-air bath should then be seated on the stove in such a way that the legs of the person are exposed to the air flowing into the stove, while the heated air escaping from the stove is flowing in ascending direction up the person's back, so that an all-round satisfactory treatment is obtained and every merely one-sided treatment, with its irritating and harmful effects to the skin, is reliable avoided.

Of course, it is also possible to use instead of two heating stages, three or more different heating stages, with the necessary air gaps W arranged between them.

The heating stove of the invention is provided with the conventional actuating switch 21 and the plug socket 22. It is intended principally for medical purposes, particularly sweating boxes, but, naturally, also can be used for room-heating and the like.

What I claim as new and desire to secure by Letters Patent of the United States is:

1. In an electric hot-air stove of the type described, a plurality of sets of heating elements, each of said sets of heating elements consisting of at least two heating elements and the heating power of the heating elements of each set of heating elements being different from the heating power of the heating elements of every other set of heating elements, said sets of heating elements being arranged parallel to one another in such a way that between said plurality of sets of heating elements air gaps are being formed extending from the lower portion up to the upper portion of the stove.

2. An electric hot-air stove as specified by claim 1, in which said heating elements consist of a rigid frame of rectangular shape, a pair of elastic strips of insulating material curved around the long-sides of said rectangular frame in V-shaped fashion and suitably spaced apart by said rigid frame, and a heating band wound around said pair of elastic strips of insulating material to thereby secure said heating band in tightly stretched condition at all stages of expansion.

MARTIN ACHNER.

REFERENCES CITED

The following references are of record in the file of this patent:

UNITED STATES PATENTS

| Number | Name | Date |
|---|---|---|
| 598,640 | McElroy | Feb. 8, 1898 |
| 893,994 | Green | July 21, 1908 |
| 1,715,518 | Schmidt | June 4, 1929 |
| 1,724,198 | Hauser | Aug. 13, 1929 |
| 1,731,624 | Henry | Oct. 15, 1929 |
| 1,892,882 | Gannon et al. | Jan. 3, 1933 |
| 1,900,318 | Van Valkenburg et al. | Mar. 7, 1933 |
| 1,932,788 | Keating | Oct. 31, 1933 |
| 1,963,755 | Mead | June 19, 1934 |
| 2,062,466 | Marr | Dec. 1, 1936 |
| 2,158,681 | Schulte | May 16, 1939 |

FOREIGN PATENTS

| Number | Country | Date |
|---|---|---|
| 458,569 | Great Britain | Dec. 22, 1936 |